United States Patent
Burgin et al.

(10) Patent No.: US 10,057,185 B1
(45) Date of Patent: Aug. 21, 2018

(54) USER-INITIATED ACTIVATION OF MULTIPLE INTERRUPTIBLE RESOURCE INSTANCES

(71) Applicant: AMAZON TECHNOLOGIES, INC., Reno, NV (US)

(72) Inventors: Joshua Marc Burgin, Seattle, WA (US); Christoph Saalfeld, Seattle, WA (US); Stephen Alden Elliott, Seattle, WA (US); Joby Sky Lafky, Seattle, WA (US); Aniruddha Shriram Daptardar, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 14/860,637

(22) Filed: Sep. 21, 2015

(51) Int. Cl.
 *G06F 15/173* (2006.01)
 *H04L 12/911* (2013.01)

(52) U.S. Cl.
 CPC .......... *H04L 47/781* (2013.01); *H04L 47/821* (2013.01)

(58) Field of Classification Search
 CPC .............................. H04L 47/781; H04L 47/821
 USPC .................................................. 709/223, 226
 See application file for complete search history.

(56) References Cited

U.S. PATENT DOCUMENTS

| | | | |
|---|---|---|---|
| 2006/0155633 A1* | 7/2006 | Fellenstein | G06Q 10/06 705/37 |
| 2006/0167984 A1* | 7/2006 | Fellenstein | G06F 9/5072 709/203 |
| 2012/0215587 A1* | 8/2012 | Chang | G06F 9/505 705/7.31 |
| 2013/0179894 A1* | 7/2013 | Calder | G06F 9/5027 718/104 |

FOREIGN PATENT DOCUMENTS

WO  WO 2013095083 A1 *  6/2013 .............. G06F 8/63

* cited by examiner

*Primary Examiner* — Joseph E Avellino
*Assistant Examiner* — Marshall McLeod
(74) *Attorney, Agent, or Firm* — Blank Rome LLP

(57) ABSTRACT

This document describes techniques for activating multiple interruptible resource instances on servers of a service provider environment. In an example embodiment, a system can activate multiple interruptible resource instances on behalf of a given customer based on a comparison of a bid cost value from the customer to the current, but variable cost value of the interruptible resource instances. The customer also can specify a value indicative of the number of interruptible resource instances to be activated on behalf of the customer based on the bid cost value.

19 Claims, 12 Drawing Sheets

1. Configure Batch Spot Request   2. Configure Instance   3. Add Storage   4. Tag Instance   5. Configure Security Group   6. Review Step 1. Use this wizard to tell us how much compute capacity you desire, which AMI to use, and how much to bid. We will submit Spot requests on your behalf to try to launch up to your total desired capacity.

Spot Batch Request Name: my_token_123 — 204

Choose your AMI: ami-123456   Browse — 208
206 AMI Name: My Batch App AMI
Platform:   Linux/UNIX   Architecture:   64-bit, paravirtual, EBS-backed Choose the Instance Types and Availability Zones permissible for your application (ctrl-click to select more than one).

Instance Types: All HVM instance types ▼ — 210
Availability Zones: All us-east-1 AZs ▼ — 212

Tell us your target compute capacity in the units of your choice, and what you're willing to bid.

Total Desired Capacity: 1,000 — 220   instances ▼ — 221
Max Bid Price: $0.050 — 225   per instance-hour Avg. Spot prices/unit-hr (low-high): $0.004 ($0.003 - $0.016) ⎫
Avg. On Demand prices/unit-hr: $0.05                         ⎬ — 230
                                                             ⎭

Advanced Batch Settings — 235

Maximum Potential Price per Hour: $50.00 — 234

→ Submit   Cancel
236

FIG. 2

USER-INITIATED ACTIVATION OF MULTIPLE INTERRUPTIBLE RESOURCE INSTANCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Operators of provider networks try to avoid having unused virtual resources. Some virtual resources may be reserved the exclusive use, while other virtual resources are purchased on an on-demand basis (i.e., when needed). Service providers generally want to ensure that they have enough virtual resources available to satisfy all of their customers' needs, but doing so is problematic due to the somewhat unpredictable nature of customer needs, unplanned outages of certain virtual resources, physical servers, or even entire data centers. Consequently, service providers generally provide an excess of virtual resources relative to what customers will actually need. The excess helps to ensure that all customers are able to acquire whatever virtual resources they need when they need them. However, providing excess virtual resources adds cost to the service provider in the form of excess, but non-revenue generating, virtual resources.

BRIEF DESCRIPTION OF THE DRAWINGS

For a detailed description of various examples, reference will now be made to the accompanying drawings in which:

FIG. 2 shows a graphical interface by which a customer can submit a request for a spot fleet in accordance with various examples;

DETAILED DESCRIPTION

Figure 1:
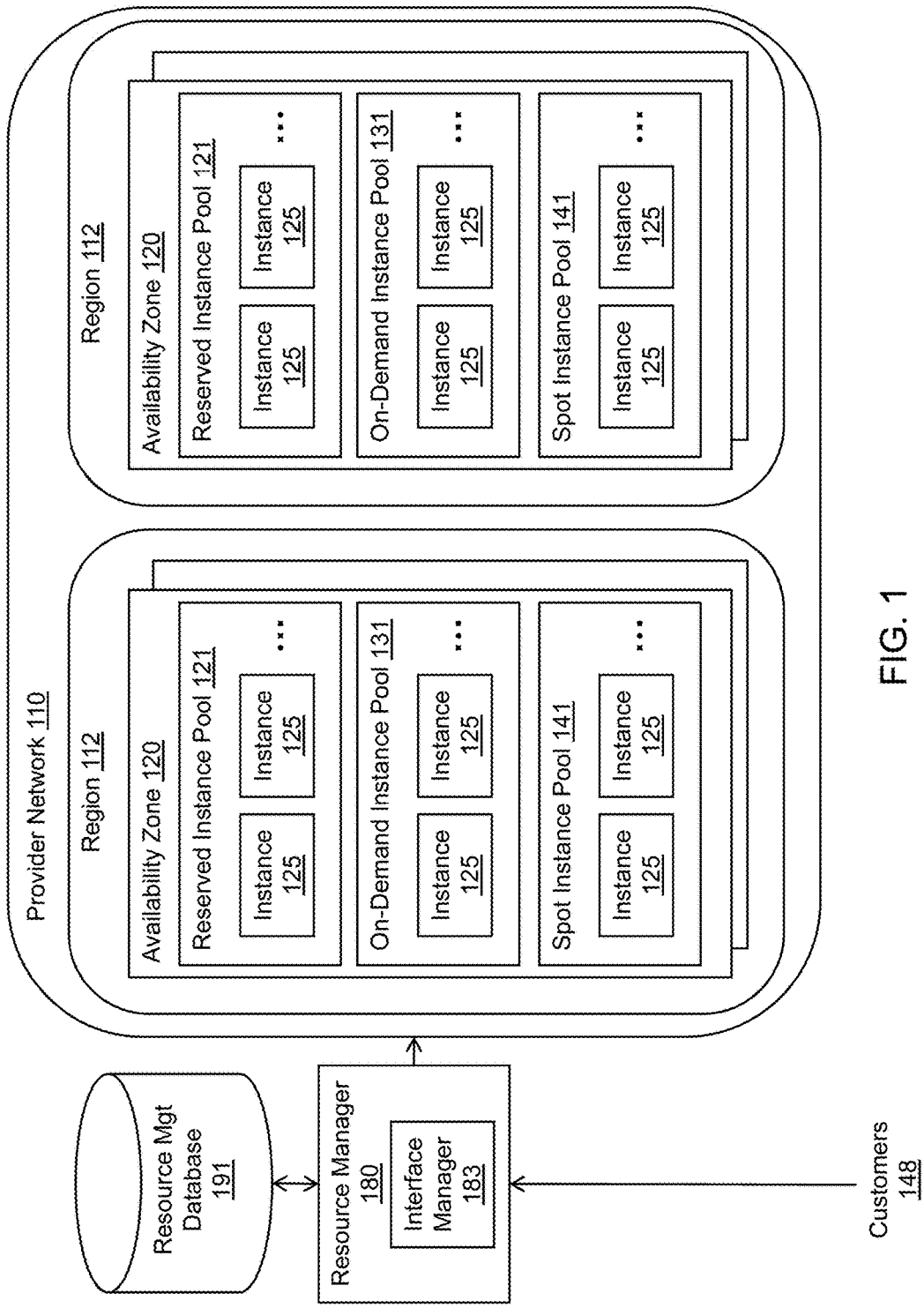
FIG. 1 illustrates a provider network for implementing fleets of spot instances in accordance with various examples.

Various embodiments are described of methods and apparatus for providing multiple resource instances (e.g., virtual machines running on physical servers) on a "spot market" for use by customers in response to requests from the customers for the resource instances. Networks set up by an entity such as a company or a public sector organization to provide one or more services (such as various types of cloud-based computing or storage) accessible via the Internet and/or other networks to a distributed set of customers may be termed "provider networks" in this document. A provider network may include numerous data centers hosting various resources, such as collections of physical and/or virtualized computer servers, storage devices, networking equipment and the like, needed to implement and distribute the infrastructure and services offered by the provider. The resources may in some embodiments be offered for reservation by (and allocation to) customers in units called "resource instances," such as virtual or physical compute instances or storage instances. A virtual compute instance may, for example, comprise one or more servers with a specified computational capacity (e.g., a particular type and number of central processing units (CPUs), an amount of main memory, storage device number and size, etc.) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

Operators of such provider networks may permit customers to purchase the use of resource instances in accordance with a variety of purchasing modes. Examples of purchasing modes include a long term reservation mode, an on-demand mode, a spot price mode, and a spot fleet mode. In the long term reservation mode, a customer may make a low, one-time upfront payment for a resource instance, reserve it for a specified duration such as a one or three year term, and pay a low hourly rate for the instance. The customer will be assured of having the reserved instance available for the term of the reservation. Using on-demand mode, a customer can pay for capacity by the hour (or some other appropriate time unit), without any long-term commitments or upfront payments.

In the spot price mode, a customer can specify the maximum price (i.e., cost value) per unit time that the customer is willing to pay for a particular type of resource, and if the customer's maximum price exceeds a dynamic spot price (i.e., cost value) determined at least in part by supply and demand, that type of resource would be allocated for use to the customer. The spot price mode permits a customer to obtain a single resource instance. If the customer desires multiple instances, the customer would have to submit multiple requests for the spot instances. A spot instance assigned to a specific customer may be interrupted when that instance's current spot price exceeds the maximum price. That is, customers may purchase the use of spot instances and such pricing may be lower than other purchase modes (at least in part because the customer is able to specify the maximum acceptable price), but the spot instance may be removed from the customer's use once the spot price exceeds the customer's maximum price. Thus, spot instances are interruptible and customers should be aware that continued use of their spot instances is not guaranteed. Spot instances are also referred to herein as interruptible resource instances.

In the spot fleet purchasing mode, the customer can submit a single request for multiple spot instances. In a spot fleet request, the customer specifies a bid price and a total desired capacity of the resource instances to be included in the spot fleet. For example, the customer may specify a bid price of $0.10/hour with a total desired capacity of 100 instances of a particular type. That is, the customer wants to run 100 instances and does not want to pay more than $0.10 per hour for each instance. If 100 instances of the customer-specified type are available at a price equal to or less than $0.10, then the customer's spot fleet request is honored and 100 instances are activated for use by the customer. Such instances continue to be activated for the customer as long as the spot price does not increase above $0.10/hour. If the price ever does exceed $0.10, then the customer's spot fleet automatically may be deactivated.

Various embodiments of spot fleets are described herein. In one embodiment, the bid price for a spot fleet request is a maximum price per hour that the customer is willing to pay for a particular resource instance type, and the total desired capacity is the number of such resource instances that the customer wants to be activated in his fleet. The customer also may specify the type of resource instances to be included in the spot fleet. The provider network activates spot instances of the desired type and that have spot prices below the customer's specified bid price. The provider network attempts to activate a number of spot instances for the customer equal to the specified total desired capacity.

Some customers may care more about the price of a particular resource instance relative to its processing power. That is, two different instance types may have two different spot prices—one more expensive than the other (e.g., $0.20/hr versus $0.12/hr). The more expensive resource instance may have three times the processing power of the less expensive resource instance and thus may be a better bargain for the customer. The more expensive resource instance may have three physical CPUs to only one CPU for the less expensive resource instance. Thus, in other embodiments, the customer can submit a request that specifies a bid price in terms of a maximum price per resource unit. A "resource unit" may pertain to physical CPUs, virtual CPUs (vCPUs), an amount of memory or other such resource units. For example, a customer may specify a bid price as $0.10/CPU-hour. That is the customer is willing to pay no more than 10 cents per hour for each physical CPU, without regard to the number of CPUs that are present in a given resource instance. The total desired capacity is also specified by the customer in resource units. For example, the spot feet request may specify 150 CPUs as the total desired capacity. In this example, the user has requested a spot fleet to include enough resource instances such that the total number of CPUs contained in the fleet is 150 and that the per CPU-hour cost is no more than $0.10. A particular resource instance might have a current spot price of $0.32/hour and have four CPUs. As such, the per CPU-hour cost for that particular instance is $0.08 and such an instance therefore would comply with the customer's spot fleet request, which has a bid price of $0.10/CPU-hour.

In another embodiment, the spot fleet request may be specified in terms of a "per job-hour" cost. For example, a customer may want a spot fleet to be activated that can process a certain number of the customer's jobs per hour. Through prior benchmarking or other techniques, the customer may already know that a certain type of resource instance can process a certain job type in a certain amount of time. The customer can assign weights to the various resource instance types offered by the service provider commensurate with each such resource instance's ability to process the customer's jobs in a given period of time. For example, a resource instance that can process one job per hour on average may be assigned a weight of 1, while another resource instance that can process 2.5 jobs per hour on average may be assigned a weight of 2.5. The customer's spot fleet request may specify a bid price of $0.10 per job-hour and a total desired capacity of 300 jobs. This customer wants enough resource instances to be activated of a type such that 300 of the customer's jobs can be completed each hour at a price that is no more than $0.10 per hour for each job.

In some embodiments, a customer can specify a strategy (e.g., via a user interface) as to how the resource manager 180 is to launch instances to form the fleet for the customer once the resource manager 180 uses the customer-specified spot fleet request to determine which instances are suitable candidates for being launched. For example, the customer can specify a "lowest cost" strategy in which the system attempts to launch instances while minimizing the total cost to the customer. Another strategy could be that the fleet is to be populated with as many spot instances as possible given the requirements (e.g., maximum bid price) of the spot fleet request, but that the fleet can be supplemented with non-spot instances (e.g., on-demand instances) as needed to fully populate the fleet, and if the customer so permits non-spot instances to be included.

In some embodiments, the provider network includes multiple pools of resource instances. The pools are of different types based on the pricing mode of the resource instances in the pools. One such pool may include reserved resource instances, that is, resource instances that are available to be reserved by customers as noted above. Another pool may include on-demand resource instance. Yet other pools include spot instances which can be launched in response to spot requests for individual resource instances, or launched in response to spot fleet requests. The provider network may include more than one spot instance pool. The resources instances in the various pools may be of the same type or of different types. The spot price of the resource instances in the spot instance pools may vary over time with respect to changing supply and demand. The spot price of the instances within a given pool may be the same, but the spot price may vary from pool to pool, even between pools containing the same type of resource instances. The resource instances of multiple spot instance pools may comply with the bid price of a given spot fleet request. That is, the current spot price of multiple pools may be lower than the customer's bid price. In such cases, the provider network may activate spot resource instances from a particular pool that is at the lowest spot price in an attempt to satisfy the customer's spot fleet request. If there is an insufficient number of resource instances in that particular pool, then the provider network may go to the next spot instance and, assuming the spot price of that pool is lower than the bid price, activate additional resource instances from that pool to satisfy the total desired capacity in the spot fleet. This process may continue until the spot fleet is fully satisfied.

During operation of the spot resources in a spot fleet, the current spot price may rise (due to supply and demand effects) above the bid price specified in the original spot fleet request. When this happens, the provider network will interrupt (e.g., deactivate) the resource instances whose price is now too high, and attempt to backfill those resource instances with additional resource instances from the spot instance pools while still satisfying the spot fleet request.

FIG. 1 illustrates a system environment in accordance with at least some embodiments. The system 100 includes a provider network 110 comprising a plurality of geographical regions 112. Each geographical region 112 may include one or more availability zones 120. An availability zone may also be referred to as a data center. Each availability zone 120 in turn may include a plurality of resource instances 125. A resource instance may be a virtual machine which runs on a physical server. The resource instances may be organized into various resource pools in some embodiments, such as a reserved instance pool 121, an on-demand instance pool 131, and a spot instance pool 141. The various resource instances 125 in the different availability zones 120 may be reserved and/or allocated for use by customers 148 (e.g., customers of the operator of the provider network 110). Although the instances 125 illustrated in FIG. 1 are shown as belonging to availability zones 120, in other embodiments the provider network 110 may be organized differently: e.g., in some embodiments availability zones may not be implemented. Instance pools may be implemented within availability zones in some implementations (e.g., each availability zone may have its own reserved instance pool), while in other implementations an instance pool or sub-pool may span multiple availability zones.

In the illustrated embodiment, system 100 includes a resource manager 180 operable to perform a variety of operations in response to requests submitted by customers 148. An interface manager component 183 of the resource manager 180 may in some embodiments implement one or more programmatic interfaces allowing customers 148 to submit requests for resource instances 125 of the various pools 121, 131, 141. For example, the interface manager 183 may receive a request for a spot fleet from a customer 148. The resource manager 180 processes the spot fleet request and attempts to satisfy the request and build a fleet of resource instances for the customer from one or more of the spot instance pools 131 per the requirements encoded into the spot fleet request itself as explained below. The interface 183 implemented by the resource manager 180 also may support a variety of other functionality such as allowing customers to cancel or modify a currently running spot instance or fleet of spot instances, search for, browse, reserve and acquire desired types of instances 125 to obtain various types of services.

FIG. 1 also shows a resource management database 191 which in some embodiments may include an identity of each resource instance 125 currently running on behalf of each customer. The information in the resource management database 191 may indicate which fleets are active for each customer (e.g., as identified by a fleet identifier) and the number and type of resource instances operating within each such fleet.

Each instance pool 121, 131, and 141 may have associated resource management and pricing policies which govern, for example, whether a reservation or allocation of a resource instance can be interrupted, whether reservations of one customer can be resold to another, the different types of static and dynamic pricing rates in effect for instances of the pool, and so on. The various types of instance pools 121, 131, 141 may be the same or different between the various availability zones 120 within a region 112 and may be the same or different between the different regions. The pools may represent logical collections or aggregations. For example, the presence of two instances in the same pool or sub-pool may not necessarily imply anything about the physical location of the hardware used for the two instances.

The reserved instance pool 121 includes resource instances that may be reserved by customers 148 for fairly long periods of time, such as one-year terms, three-year terms, etc. by paying a low, one-time, upfront payment for the resource instance, and then paying al low hourly rate for actual use of the instance at any desired times during the term of the reservation. Thus, the customer 148, by making the long-term reservation, may be assured that its reserved instance will be available whenever it is needed. If a customer 148 does not wish to make a long-term reservation, the customer may instead opt to use on-demand instances from the on-demand instance pools 131. The pricing policy for the on-demand instance pools 131 may allow the customer 148 to pay for resource capacity by the hour with no long-term commitment or upfront payments. The customer 148 may decrease or increase the resource capacity used, based on application needs, and may only pay the hourly rate for the instances used. In some cases the per-hour pricing for on-demand instances may be higher than the hourly rate for reserved instances, because the relatively long durations of reservations may provide a more stable revenue stream to the operator of the provider network than the potentially more dynamic revenue stream provided by on-demand instances.

The spot instance pools 141 provide another type of resource purchasing and allocation model. Two pricing policies exist for the resource instances in the spot instance pool 141. A spot instance pricing policy allows a customer 148 to specify the maximum hourly price that the customer is willing to pay for a single resource instance, and the resource manager 180 dynamically may set a spot price for a given set of resource instances in the spot instance pool 141 based on the prices customers are willing to pay and on the number of resource instances available in each such spot instance pool 141. If a customer's bid meets or exceeds the current spot price, a resource instance from the spot instance pool 141 may be allocated to the customer. While that instance is running on behalf of the customer, if the spot price for that type of instance rises above the customer's bid price, access to that instance by the customer may be revoked (e.g., the instance may be shut down). As such, spot instances are interruptible based, for example, on the bid price in relation to the dynamically varying spot prices.

Another example of a pricing policy for the spot instance pool 141 is a spot fleet pricing policy. In this model, and as noted above, rather than specifying a bid price to acquire use of a single spot resource instance, the customer specifies a bid price for a plurality of resource instance (i.e., a fleet of instances). FIG. 2 shows an example of a user interface 200 implemented, for example, by the interface manager 183 of the resource manager 180 to allow a customer to submit a request for a spot fleet. The customer may interact with the user interface on his or her own computing device (e.g., desktop computer, portable computer, smart phone, tablet device, etc.). The interface manager 183 may provide the user interface to the customer's device as a web page to be displayed in a browser running on the customer's device.

In entry field 204, the customer can enter a customized request name which permits the request being submitted to be tracked and viewed by the user at a later point in time, canceled, edited, etc. In entry field 206, the customer can submit an identifier of a virtual machine image to be used to launch the resource instances in the customer's requested fleet. A virtual machine image defines the desired elements of the virtual (i.e., the resource instance), such as the guest operating system, the number and type of CPUs, the number of network ports, the amount of memory, etc. Such virtual machine images may be previously created and stored for subsequent use by the customers thereby avoiding the customers from having to manually recreated the various desired aspects of a resource instance. A "browse" button 208 is provided to enable the customer to search for and select a desired virtual machine image.

Entry field 210 permits the customer to specify one or more types of resource instances that can be included in the customer's desired spot fleet. The differences between the various resource instances may be in relation to any one or more of the following: number of physical or virtual CPUs, type of physical CPUs, amount of volatile memory, amount and type of non-volatile storage, whether the instance has a hardware video encoder, the number of high definition video streams supported by the video encoder (if included), etc. The entry field 210 may be implemented as a drop-down menu or the customer can manually type in the types of resource instances desired. A virtual CPU ("vCPU), mentioned above, can be defined in any of a variety of ways. For instance, a vCPU can be a single hyperthread of a particular multithreaded CPU core such as an Intel Xeon core.

The customer can specify one or more availability zones 120 in entry field 212 from whose spot instance pools 141 the resource manager 180 is permitted to select resource instances to support the desired spot fleet for the customer. The availability zones 120 may be selected by way of a drop-down menu, or the customer may type in the names of the desired availability zones. This field may be left blank or supplied with "all availability zones" (or equivalent) to specify that the customer wants all availability zones in the provider network 110 to be considered to assemble the desired spot fleet. In some embodiments, the user interface also may permit a customer to specify one or more regions 112 from whose spot instance pools 141 are to be considered when assembly the customer's fleet of spot instances. The user can specify one or more regions 112, and within each such region specify one or more availability zones 120.

Entry fields 220 and 225 are used by a customer to specify a total desired capacity and bid price, respectively. In some embodiments, the units for the total desired capacity can be customer-specified, such as from a drop down list via activation of button 221. For example, the units specified for the total desired capacity may be: (a) instances, (b) resource units, or (c) jobs per hour. Based on the units selected for the total desired capacity, the units of the bid price will be set to correspond to the total desired capacity units. Each of these three units for specifying a total desired capacity and bid price are discussed below.

As shown in the example of FIG. 2, the units selected for the total desired capacity is "instances" and the customer has typed in the number 1000. This means that the customer wants there to be 1000 instances in his fleet of the type(s) specified above in entry field 210. The units of the bid prices are automatically set to "per instance-hour," and the user has typed in $0.050 as the bid price. This means that the maximum price the customer is willing to pay for each of the 1000 instances in his or her fleet is $0.050 per hour. At 234, the total price that the customer may pay per hour, assuming all 1000 instances are activated into the customer's fleet, is displayed as $50 which is calculated by the resource manager 180 as the per instance-hour price of $0.050 times the maximum number of instances that could be in the customer's desired fleet (1000). By specifying a fleet request in terms of a number of instances of a specific type, the customer may have already determined which instance type(s) that the service provider offers are suitable for use by the customer.

The pricing information 230 is read from, or calculated based on data from, the resource management database 191. The average spot price (per hour of the units selected) and the low and high spot prices are shown (low and high may be determined over a prior period of time such as the last 30 days, 6 months, etc. The average on-demand price is also shown over the same time frame. These data provide some pricing context that the customer can use to determine a suitable bid price.

Once the submit button 236 is selected, the resource manager 180 attempts to satisfy the request by activating instances for the customer in accordance with the specifics of the request. The request includes the bid price per hour for each instance. The resource manager 180 compares the bid price to the current spot market price of each type of instance specified by the customer. The current spot market prices may be stored in the resource management database 191 and are thus accessed by the resource manager 180. The current spot price for a particular instance type may vary between the availability zones 120 and/or between the various regions 112. Further, the current spot price may vary between the different types of resource instances specified by the customer in the instance entry field 210. The resource manager 180 retrieves the current spot prices of the various resource instance types specified by the customer from the customer-specified availability zones and/or regions and determines which spot prices are equal to or below the bid price. Those instances whose spot prices are at or below the bid price are candidates for inclusion in the spot fleet desired by the customer. In some embodiments, the resource manager 180 activates the instances from the spot instance pool 141 that has the lowest current spot price in an attempt to activate the total desired number of instances specified in the total desired capacity entry field 220. If there are enough spot instances in that pool to fully satisfy the customer's desired fleet size, the spot fleet activation process stops at that point and the customer can use the spot instances that have been activated in his fleet.

However, if the lowest priced spot instance pool 141 does not have the total desired capacity number of instances, then the resource manager 180 activates the number of spot instances that that pool does have into the customer's fleet. The resource manager 180 then accesses the spot instance pool 141 that has the next lowest price and attempts to activate the remaining number of spot instances desired by the customer from that pool. If that pool still does not have a sufficient number of spot instances available for use by the customer to meet the total desired capacity number of instances, the resource manager 180 goes on to the next lowest priced spot instance pool, and so on. If there simply are not enough spot instances to equal the customer's total desired capacity for the fleet, whichever spot instances are available that match the other requirements of the spot fleet request (e.g., bid price, instance type, etc.) are activated for the customer. An alert message may be provided to the customer via the resource manager 180 to indicate that an insufficient number of spot instances were activated. The customer could choose to deactivate those instances if desired. Alternatively, rather than launching the available instances and then alerting the customer, the customer could be prompted by the resource manager 180 to authorize the activation of the number of spot instances that are available. If the customer confirms the activation, then the resource manager 180 proceeds with activating the available spot instances; otherwise, no instances are launched into the customer's fleet.

In some embodiments, the service provider may force the customer to enter a bid price that is within a predefined range. The maximum allowable bid price may be instance type specific and/or may be preset for the customer or set by the customer in his account settings. The minimum allowable bid price may be an absolute price of, for example, $0.001. The resource manager 180 may perform a validation on the spot fleet request upon its submission. Other validations may be performed as well, such as validating that the customer does not have more than a maximum number of spot and spot fleet bids outstanding in the system.

The user interface 200 for the spot fleet request may permit additional parameters to be specified by the customer, and such parameters may be entered by selecting the "advanced batch settings" button 235. Such additional parameters may include a "valid from" date and a "valid to" date. The "valid from" date specifies a date before which the resource manager 180 will not evaluate the spot fleet request in an attempt to create the spot fleet for the customer. The "valid to" date specifies a date after which the resource manager 180 will not evaluate the spot fleet request in an attempt. During the operation of the spot fleet, certain spot instances running on behalf of the customer may be interrupted due to their current spot price increasing as a result of supply-demand pressures to the point that the spot price exceeds the bid price for the spot fleet. When that happens and a spot instance ceases to run for the customer in his fleet, the resource manager 180 attempts to back-fill that spot instance with a spot instance from one of the spot instance pools 141 that complies with the customer's spot fleet request. Thus, during the operation of the spot fleet, there still may be a need for the resource manager 180 to evaluate the spot fleet request. The "valid to" date is the date after which the resource manager 180 will stop evaluating the spot fleet request. The "valid to" and "valid from" dates may be specified as date and time of day in some examples.

Another option that may be specified in the spot fleet request user interface 200 is a termination option. This option dictates the behavior of the spot instances when the "valid to" date is reached. In one embodiment, the customer can dictate that the currently running spot instances in his fleet are permitted to continue to run at least until they are interrupted due to the current spot price exceeding the bid price. Alternatively, the customer can specify that the entire fleet is to cease operation when the "valid to" date is reached.

In another example, the customer may select via button 221 in FIG. 2 the units for the total desired capacity to be "resource units." As noted above, a resource unit may pertain to physical CPUs, vCPUs, an amount of memory or other such resource units. The customer may care less about the number of instances that are included in the fleet than the effective per hour price of a particular type of resource unit. For example, a customer may want 1500 vCPUs and may be willing to pay $0.020 per hour for each vCPU. The customer can select "resource unit" from a drop-down menu, which may further trigger another drop-down menu of various types of selectable resource units, and select, for example, "vCPUs" as the total desired capacity unit. Alternatively, the drop-down menu triggered by selecting the menu button 221 may list "vCPU" as one of the choices, along with the other types of available resource units. Once the vCPU resource unit is selected, the bid price unit automatically changes to "per vCPU-hour." The customer enters 1500 for the total desired number of vCPUs and $0.020 that the customer is willing to pay for each vCPU to operate for one hour. The resource manager 180 then will attempt to launch enough instances of an acceptable type (acceptable per the customer's specifications entered via entry field 210) to satisfy the customer's desired number of vCPUs. At 234, the total price that the customer may pay per hour for the total number of instances in the fleet, assuming the total number of resource units desired by the customer is satisfied, is calculated and displayed.

A weight value may be specified for each type of instance based on the number of resource units that each such instance contains. For example, a weight value of 1 for a particular instance may indicate that that instance includes one physical CPU, while a weight value of 4 may indicate that the instance has 4 CPUs. The weight values may be specified by the service provider or by the customer. The weight values are used to determine which instances are to be included in the customer's fleet as explained below.

In another example, the customer may select via button 221 the units for the total desired capacity to be "jobs." Through prior experience with the service provider's provider network, the customer may be able to calculate that a particular type of virtual machine instance may be able to complete a certain number of jobs in a given period of time (e.g., 1 job per hour, 2.5 jobs per hour, etc.). The amount of time a given instance type takes to complete a particular job may be a function of a variety of factors such as the number of physical CPUs present in the instance type, the amount of memory, the type of operating system, etc., as well as the type of job itself. The customer may have collected benchmark data for its particular type of job and thus may know how long each of the various types of instances take to complete the typical type of job for the customer. Such benchmark data is particularly useful if the customer tends to frequently run the same types of jobs. If the customer knows how long each type of instance takes to run a given type of job, then the customer can specify the bid price and total desired capacity on the basis of jobs.

For example, a customer may specify the total desired capacity to be 1000 job-hours (entry field 220) meaning that the customer wants enough instances in his fleet so as to complete 1000 jobs per hour. Some types of instances can complete more jobs per hour than other types of instances and thus fewer instances of the former type would be needed to complete 1000 jobs each hour. The customer can also specify a per job-hour bid price (entry field 225) of $0.050 meaning that the customer is willing to pay no more than $0.050 to have each job completed in one hour. If a particular type of instance can complete one job per hour but that instance has a current spot price of $0.10 per hour, then that particular instance would not be selected to be included in the customer's fleet. However, if another type of instance can complete two of the customer's jobs in an hour and that instance's current spot price is $0.10 then the instance's price equates to $0.050 on a per job-hour basis and that instance could be selected to be included in the fleet.

A weight value for each instance type can be specified based on the number of jobs the instance is able to complete in an hour, which may be known based on benchmark data for the instance type by the customer. A weight value of 1 may indicate that that instance can complete one job per hour on average, while a weight value of 2.5 may indicate that the instance can complete 2.5 jobs per hour on average. The weight values may be specified by the service provider or by the customer. The weight values are used to determine which instances are to be included in the customer's fleet as explained below.

Figure 3:
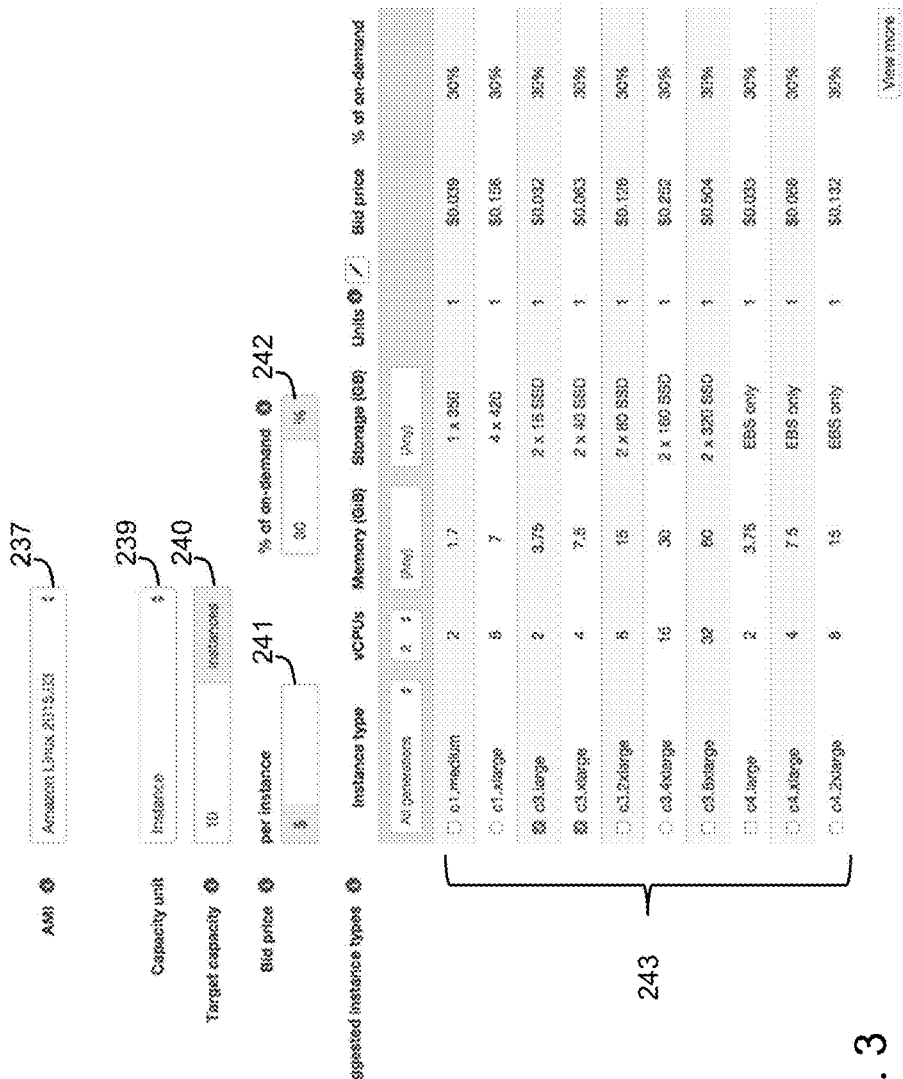
FIG. 3 shows another graphical interface by which a customer has submitted a spot fleet request for a certain number of resource instances in accordance with various examples.

FIG. 3 shows an example of another user interface by which a customer can specify a spot fleet request. In this example, the customer can specify in an entry field 237 (e.g., select from a drop-down menu) one or more machine images to use when launching resource instances into the customer's fleet. A machine instance may specify a variety of elements such as the type of virtual machine, the guest operating system, the configuration of the network ports, etc.

Entry field 239 permits a customer to specify the units on which the request is to be based. In the example of FIG. 3, the customer has specified "instance" in entry field 239. This means that the customer will specify a bid price on a per-instance-hour basis and a total capacity for the fleet to the total number of resource instances to be included in the fleet. Entry field 240 permits the customer to enter an integer number that corresponds to the total number capacity units to be launched into the fleet. In this example, the customer has specified "instance" as the capacity unit in entry field 239, and the number "10" in total capacity entry field 240. Thus, the customer in this example wants to have 10 resource instances launched into his or her fleet.

The bid price is entered in either entry field 241 or 242. Entry field 241 accepts a typed entry of the actual bid price the customer desires (e.g., dollars per hour). Instead of dollar (or other monetary unit) for a bid price in entry field 241, the customer can enter a percentage of the on-demand price in entry field 242. This means that the customer can specify that he or she wants the bid price to be a certain percentage of whatever the current on-demand price happens to be for the corresponding resource instances. In the example of FIG. 3, the customer has entered 30% in entry field 242. In so doing, the customer indicates that he wants the bid price to be 30% of the current on-demand price.

The resulting applicable resource instances are listed below at 243. Each of these resource instances comply with the customer-specified options. For example, the current spot price for the instance is equal to or less than the bid price specified by the customer via entry fields 241 or 242. For each resource instance, the user interface shows the instance type, the number of vCPUs, the amount of system memory, the amount of non-volatile storage, and the bid price. In this example, as the customer specified a bid price in the form of 30% of the on-demand price, the bid price shown for each resource is calculated as 30% of the on-demand price for that corresponding resource instance. The current on-demand price for each instance type can be accessed from the resource management database 191 by the resource manager 180.

The customer can select one or more of the resource instances listed at 243. The selection can be by way of check boxes as shown in the example of FIG. 3. If only one instance type has been selected, the resource manage r 180 tries to activate only that one type of resource instance to satisfy the customer's specified total capacity. If multiple resource instance types are selected, the resource manager 180 attempts to fill the spot fleet with resource instances of either or all types that were selected. For example, the resource manager, considering only the spot instance pools 141 with the instance types specified by the customer at 243 may activate resource instances with the lowest current spot price, and then turn to the next lowest price pool to launch instances, and so on.

Additional information may be included in the user interface of FIG. 3 such as the pricing information 230 and the maximum potential price per hour 234 of the user interface example of FIG. 2. Other information can be displayed as well.

Figure 4:
FIG. 4 shows a user interface which indicates the launch specifications based on the customer's input spot fleet request in accordance with various examples.

FIG. 4 shows an example of a user interface which shows the launch specifications that the customer's entry field data generated. The customer can choose to launch instances into the fleet, cancel the spot fleet request or edit the request.

Figure 5:
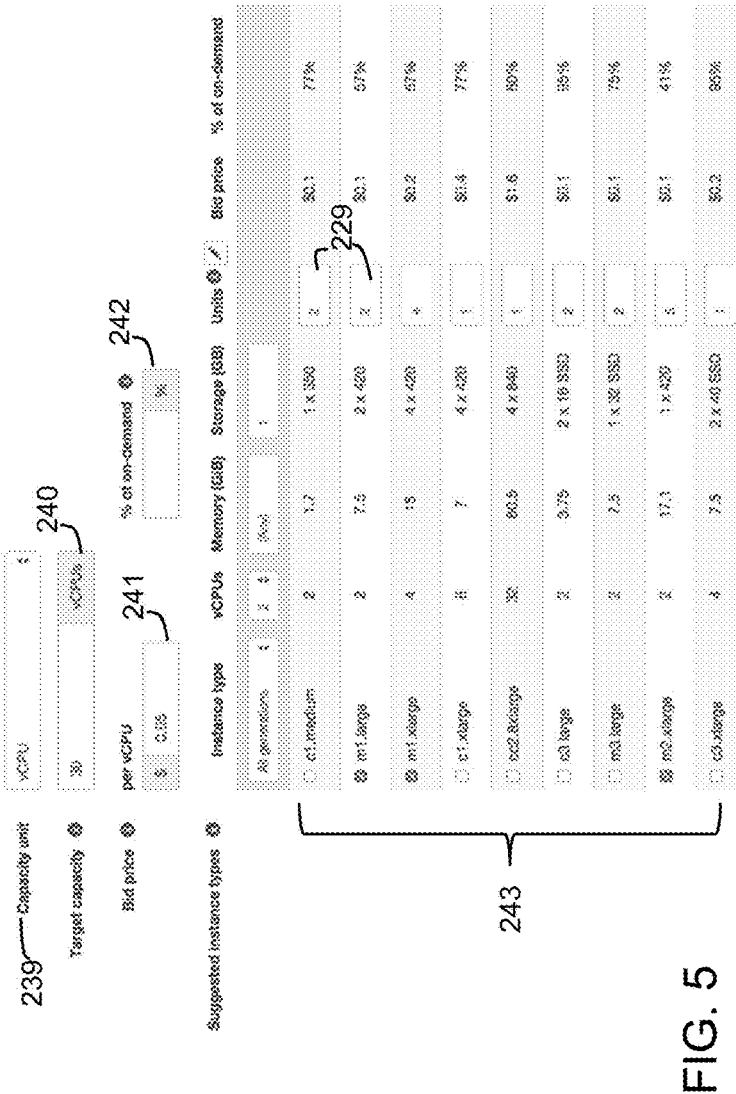
FIG. 5 shows the graphical interface in which a customer has submitted a spot fleet request for a certain number of capacity units in accordance with various examples.

FIG. 5 shows an example of the user interface of FIG. 3 in which the customer has specified a capacity unit of "vCPU" in entry field 239. As such, the target capacity of 30 entered in entry field 240 and the bid price of $0.05 in entry field 241 means that the customer desires to have 30 vCPUs in his fleet and will pay no more than $0.05 per hour for each vCPU. The resource instances from the spot instance pools 141 that comply with the customer's request of a price that is no more than $0.05 per hour for each vCPU is shown at 243. The bid price has been converted to a per resource instance-hour basis in the listing of matching resource instances. The customer can select any one or more of the resource instance types from this list and the resource manager 180 will form the fleet accordingly.

FIG. 5 also illustrates that the customer can specify unit weight values (also called priority values) in entry field 229 for each matching resource instance. The higher the weight value assigned by the customer, the more valuable or highly rated that the instance is in the launch specification. That is, between an instance that the customer has weighted as "5" and an instance with a weight of "2," the resource instance manager 180 will favor launching the instances with weight value of 5 before launching the weight 2 instances. The resource manager 180 may employ any suitable formula based on the current price and the weights to determine the order in which to launch instances to form the fleet.

Figure 6:
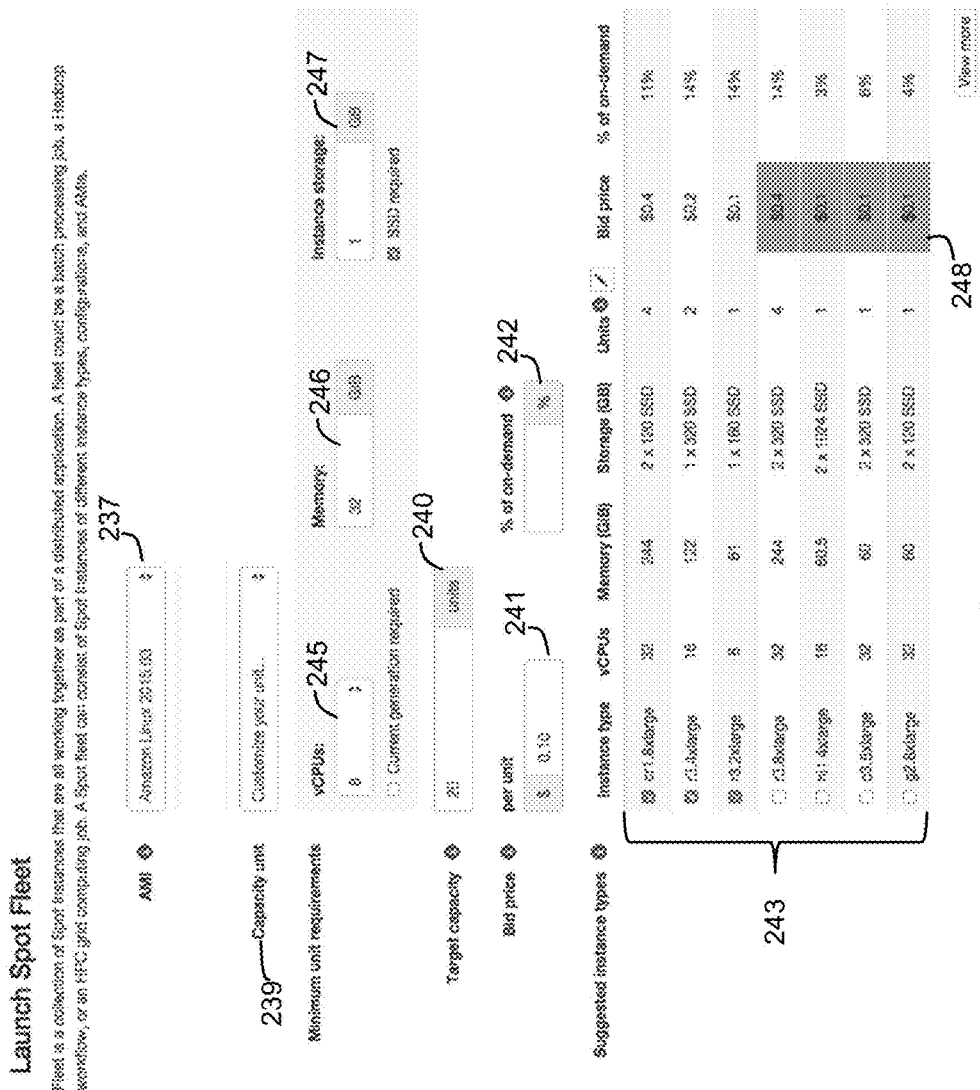
FIG. 6 shows the graphical interface in which a customer has submitted a spot fleet request for a minimum number of unit requirements in accordance with various examples.

FIG. 6 shows an example of the use of the user interface in which the customer has selected a customizable capacity unit at entry field 239. Upon selecting that capacity unit, the user interface (via interface manager 183) displays entry fields 245, 246, and 247 to permit the customer to specify a plurality of different types of resource units as part of a minimum unit requirements specification. In this example, the minimum unit requirements includes a number of vCPUs (245), an amount of memory (246), and an amount of non-volatile storage (247) such as solid state drive (SSD), hard disk drive, etc. In the example of FIG. 6, the customer has specified 8 vCPUs, 32 GiB of memory, and 1 GB of SSD-based storage. The resource manager then determines which resource instances have at least the customer-specified minimum unit requirements and displays them at 243. As before, the customer can select one or more of the resource instances from the list and the resource manager 180 will attempt to satisfy the fleet from the customer-selected resource instance types.

Several of the bid prices have been highlighted at 248. The instances with the highlighted bid prices meet the customer's minimum unit requirements. However, the highlighting indicates that the spot price for those particular instances historically has typically been higher than the bid price specified by the customer. This is an indication that the customer may want to increase the bid price if he or she wants to increase the chances of being able to have those particular resource instances launched into the fleet.

Figure 7:
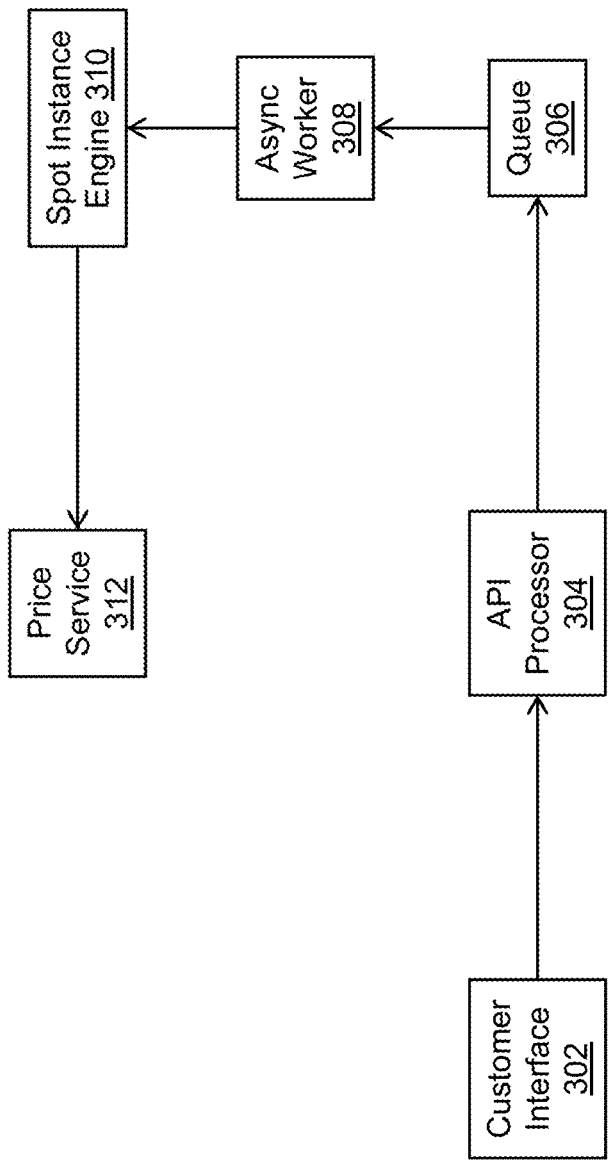
FIG. 7 shows an example of a system which implements spot fleets in accordance with various examples.

FIG. 7 shows an example of a system through which customers can create spot fleets.

Some or all of the components in FIG. 3 may implement the resource manager 180 of FIG. 2. The system includes a customer interface 302. The customer interface 302 may be a web server which generates and provides user interface web pages to a browser running on a computing device of the customer. The customer interface 302 may cause the graphical user interface of FIG. 2, or equivalent, to be displayed on the customer's computing device. Through the customer interface 302, the customer can submit a request about his desired fleet of spot instances. Examples of the type of information the customer is able include in his spot fleet request is described above with regard to FIGS. 2-6.

The information submitted by the customer may be in the form of application programming interface (API) calls which are received and processed by an API processor 304. An API processor 304 may be a computing device such as a server that executes software to implement its functionality. The API calls that the API processor 304 is able to process may include API calls to create a spot fleet, as well as API calls for related functions such as API calls to request a description of the spot instances in the customer's spot fleet(s), API calls to cancel a particular spot fleet, and so on.

In response to receiving the API calls, the API processor 304 may store one or more tasks in queue 306. The API processor 304 may generate and store multiple tasks in queue 306 to implement a given received API call. For example, multiple tasks may need to be performed in order to create a desired spot fleet. Those individual tasks are stored in queue 306.

One or more asynchronous ("asynch") workers 308 access the queue 306, retrieve one or more tasks, and execute the tasks. An asynch worker 308 may be a computing device such as a server that executes software to implement its functionality. If an asynch worker 308 encounters tasks relevant to the creation of a spot instance or spot fleet (or other spot instance/fleet related tasks), the asynch worker 308 forwards those tasks to a spot instance engine 310, which also may be implemented as a server executing software. The spot instance engine 310 attempts, for example, to create the spot fleet desired by a customer. The spot instance engine 310 may retrieve spot price data from a price service 312 to determine how the current spot price for a particular instance compares to the bid price specified by the customer in his request. The price service 312 may set the spot price for each instance based, if desired, on the availability zone 120 and region 112 containing that instance. The spot instance engine 310 may activate individual spot instances for customers in response to a request for an individual spot instance, or a fleet of instances in response to a spot fleet request.

Figure 8:
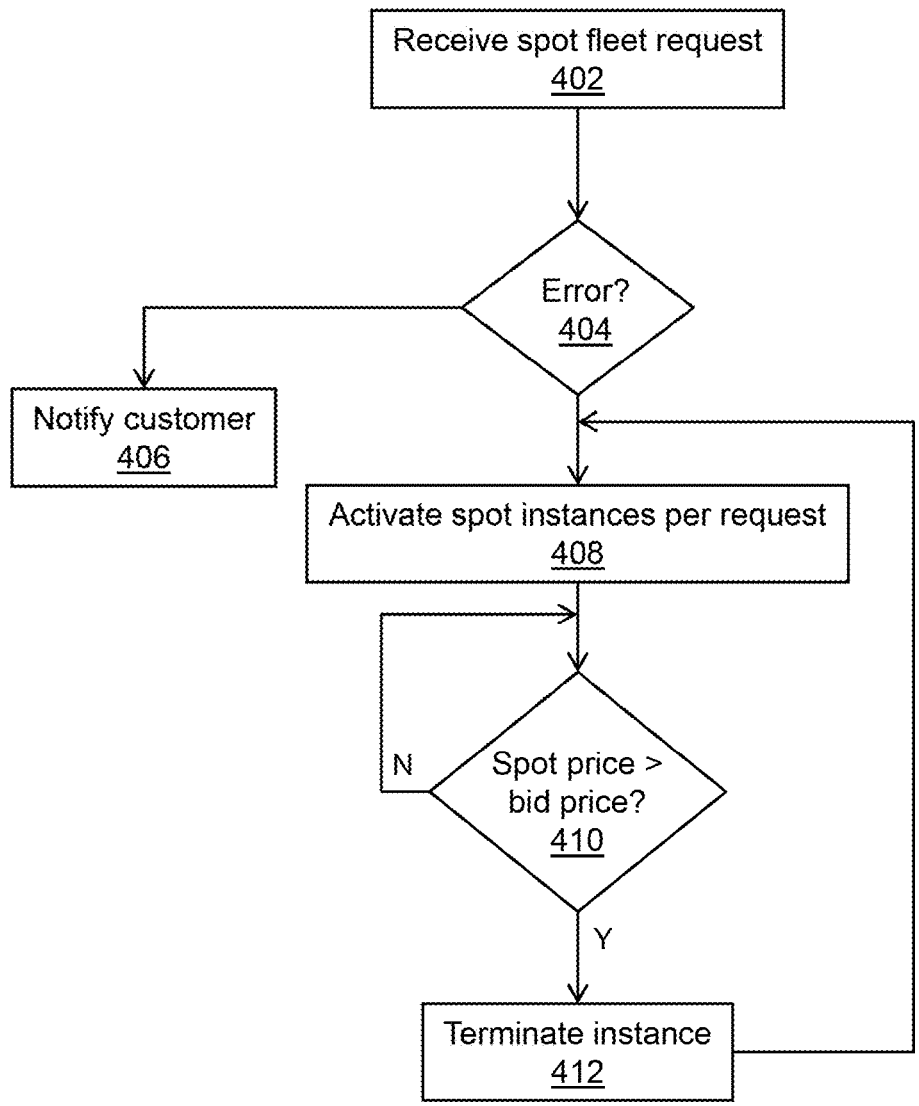
FIG. 8 shows a method for generating a spot fleet in accordance with various examples.

FIG. 8 shows a method by which a spot fleet can be created. The operations shown may be performed in the order shown, or in a different order. Further, two or more of the operations may be performed in parallel rather than sequentially. The method may be implemented by the resource manager 180, spot instance engine 310 or other computing device in the provider network.

At 402, the method includes receiving a spot fleet request. The request may be provided in the form of a web page with information completed by a customer. An example of such a web page user interface is shown in FIGS. 2-6. In the example of FIG. 7, the request may be received by the API processor 304 and stored in queue 306 pending retrieval and execution by the spot instance engine 310.

At 404, the method includes performing a quality check on the spot fleet request to determine whether the request has any errors. Any of a variety of errors may be assessed. For example, if the service provider requires the bid prices to be within a certain range (i.e., greater than a minimum acceptable value but less than a maximum value), a check can be made to ensure that the bid price submitted by the customer in entry field 220 is within the permitted range. Similarly, the total desired capacity quantity entered in entry field 225 may be checked to verify it is within an acceptable range of values. The minimum may be 1 and the maximum may be an integer number greater than or equal to one which may be a fixed number across all customers of the service provider or configured separately for each customer. Further, to the extent that the service provider permits each customer to have more than one spot fleet request outstanding at any point in time and specifies a maximum number of outstanding spot fleet requests that each customer can have, a check can be made to ensure that the maximum number of outstanding requests will not be surpassed with the current request.

If one or more of the error checks returns a positive result indicating the presence of an error, the spot fleet creation process is suspended or stops altogether and the customer is notified of the problem at 406. The error notification may be in the form of a pop-up error message on the user interface of FIGS. 2-6, an email, a text message, an audible alert, or other form of customer notification.

If, however, no errors are detected at 404, then at 408, the method includes activating spot instances in accordance with the spot fleet request. Activating a spot instance may include launching a virtual machine instance on a physical server and permitting the customer to begin using the instance. Launching a virtual machine may include executing a virtual machine image which specifies a particular guest operating system to be loaded, and various application software to run within the virtual machine instance. The virtual machine image may also configure various network ports to be used by the virtual machine, a firewall to be installed, and antivirus software to be loaded, block storage to be attached to the virtual machine, and other such actions. All of the instances to be included in the fleet may be activated at one time or may be ramped up over a short period of time.

The particular spot instances to be launched are selected based on the customer's spot fleet request which includes, among other things, a bid price and a total desired capacity. Other input values in the spot fleet request may include one or more specific instance types, one or more specific availability zones within a given region, and one or more regions. A bid price may include, for example, the maximum per instance-hour the customer is willing to pay (i.e., the price the customer is willing to pay per hour for each instance within the fleet), as well as per resource unit-hour prices and per job-hour prices. The resource manager 180 (e.g., spot engine 310) determines which instances are available in a spot instance pool 141 that includes spot instances that match the types of instance specified by the customer as being acceptable. A given region may have multiple spot instance pools 141 that are of a type that are acceptable to the customer. Further, the customer may have specified multiple regions 112 as being acceptable for his fleet and all of the spot instance pools 141 of the regions 112 specified by the customer as being acceptable are checked to compare their current spot price to the bid price specified by the customer.

In one embodiment, the spot instances from the least expensive acceptable spot instance pool 141 are activated first in an attempt to fully satisfy the customer's total desired capacity number of instances. Then, spot instances from the next least expensive spot instance pool 141 are activated to satisfy the total desired capacity number of instances, and so on. In another embodiment, by way of priority values or otherwise the customer may specify a particular order of instance types to be activated into his fleet, and the customer-specified order may be different than the lowest to highest price. For example, the customer may specify that a particular instance type should be activated first in an attempt to fill his fleet even if that instance type is not the least expensive. Of course, the instance type specified by the customer to be activated first must have a spot price below the customer's bid price to even be considered for inclusion in the fleet.

Based largely on supply and demand factors, a particular instance that has been activated into, and is currently running as part of, a customer's spot fleet may experience a spot price increase to the point at which the spot price now exceeds the customer's original bid price. At 410, the method of FIG. 8 includes determining whether the spot price of any of the active instances in the fleet exceeds the customer's bid price. That determination may be performed on a periodic basis such as once per minute, once per hour, once per day, or another time interval. If the spot price for a particular instance in a customer's fleet does exceed the bid price, then at 412 that particular instance is terminated from the fleet. The customer may be given an advanced warning that one or more of his instances are being terminated due to the spot price being too high relative to the bid price. The warning may provide the customer sufficient time to gracefully shut down any applications running on that instance.

Control then loops back to operation 408 and the method attempts to replace the terminated instance with another instance that comports with the requirements of the customer's spot fleet request. If a spot instance is found whose spot price is below the bid price, is of a type specified by the customer, and is from an acceptable availability zone and/or region, then that instance will be activated in the customer's fleet. The fleet may have multiple instances of the same type all launched from the same spot instance pool 141. It is likely, therefore, that if one instance from that pool has a spot price that is higher than the bid price, that all instances launched from that same pool will have a price that is too high. Thus, it may often be the case that multiple instances are terminated concurrently based on a bid price violation and replaced with another set of spot instances.

Figure 9:
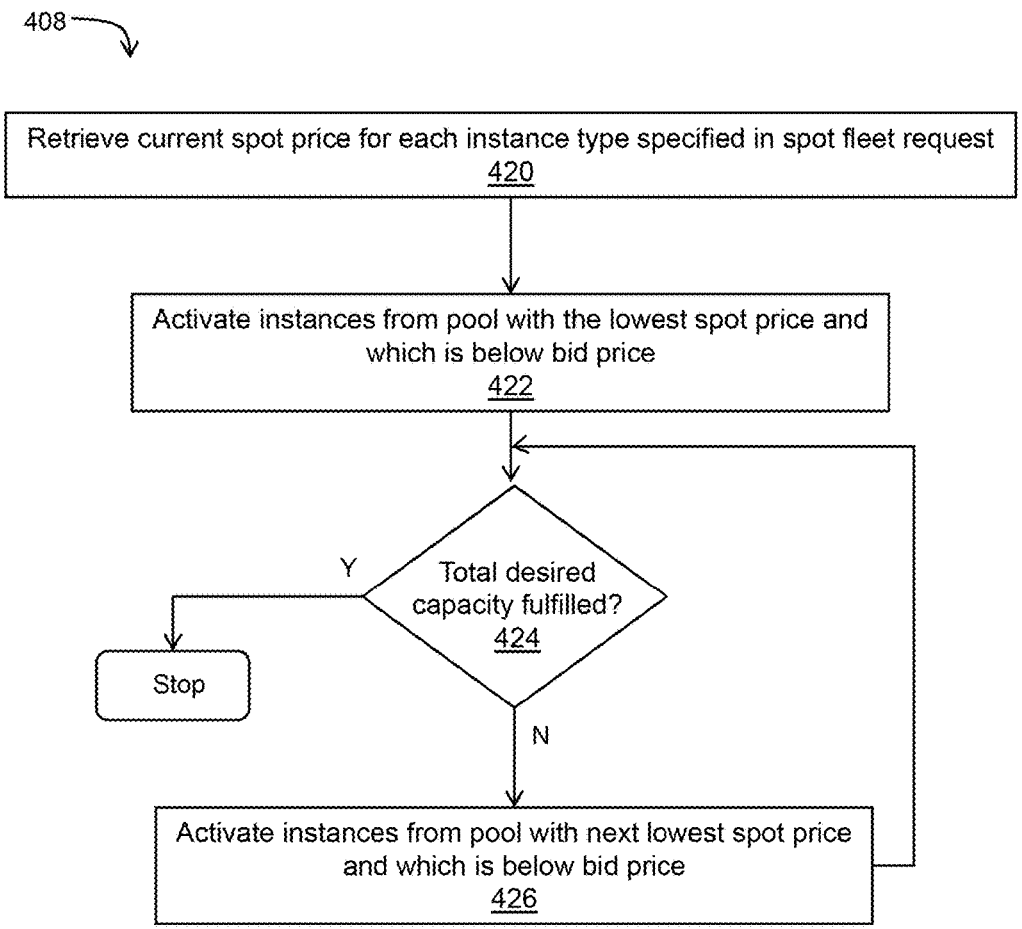
FIG. 9 shows a method for generating a spot fleet based on a per-instance bid price in accordance with various examples.

FIG. 9 shows an example of operation 408 from FIG. 8 in which spot instances are activated into a customer's fleet. This example is based on a customer specifying a bid price for each instance and specifying a particular number of instances to be included in the fleet. The operations shown may be performed in the order shown, or in a different order. Further, two or more of the operations may be performed in parallel rather than sequentially. The operations may be performed by the resource manager 180, and more specifically by the spot instance engine 310.

At 420, the current spot price is retrieved for each instance type specified in the spot fleet request. The current spot prices may be retrieved from the resource management database 191 of FIG. 1 or may be provided by the price service 312 of FIG. 7. At 422, the method includes activating instances from the spot instance pool 141 with, for example, the lowest spot price and which is below the customer's bid price. As explained above, the instances may be activated in a different order than lowest to highest spot price (e.g., in an order specified by the customer).

After activating each instance into the fleet, the method includes determining whether the fleet now includes the customer's total desired capacity, which may be, depending on the units of the bid price and total desired capacity, a customer-specified number of instances, a number of instances that includes the customer's desired number of resource units, or a number of instances that can execute the customer's desired number of jobs per hour. If the fleet is completely full relative to the customer's spot fleet request, then the process stops. Otherwise, the process continues at 426 at which the instances from the pool with the next lowest spot price and which is still below the bid price are selected for activation into the fleet. The process continues until there are no more available instances to activate into the fleet, even though the fleet remains partially satisfied, or the fleet is fully satisfied. If the resource manager 180 was unable to fully satisfy the customer's spot fleet request, the resource manager may inform the customer that of the total desired capacity request, only a specific number of (lower than the total number specified by the customer) were permitted to be included in the fleet. For example, if the customer had request 850 vCPUs, and spot instances including only 545 vCPUs were included in the fleet, then the customer is informed that 545 out of his 850 requested number of vCPUs were activated into his fleet (leaving the fleet 305 instances short).

The resource manager 180 automatically may rerun the spot fleet request at a later time in an attempt to fully satisfy a previously partially-satisfied spot fleet. Alternatively, the customer can manually initiate the rerunning of the spot fleet request. Each spot fleet request may be assigned spot fleet identifier value by the resource manager when the customer initially submits the spot fleet request. The resource manager 180 uses that identifier to differentiate newly submitted spot fleet requests from previous, possibly partially satisfied requests. In the example above, the resource manager 180 will use the identifier to try to add an additional 305 instances need to be added to the fleet and not attempt to create a new 850 instance fleet from scratch for the customer.

Figure 10:
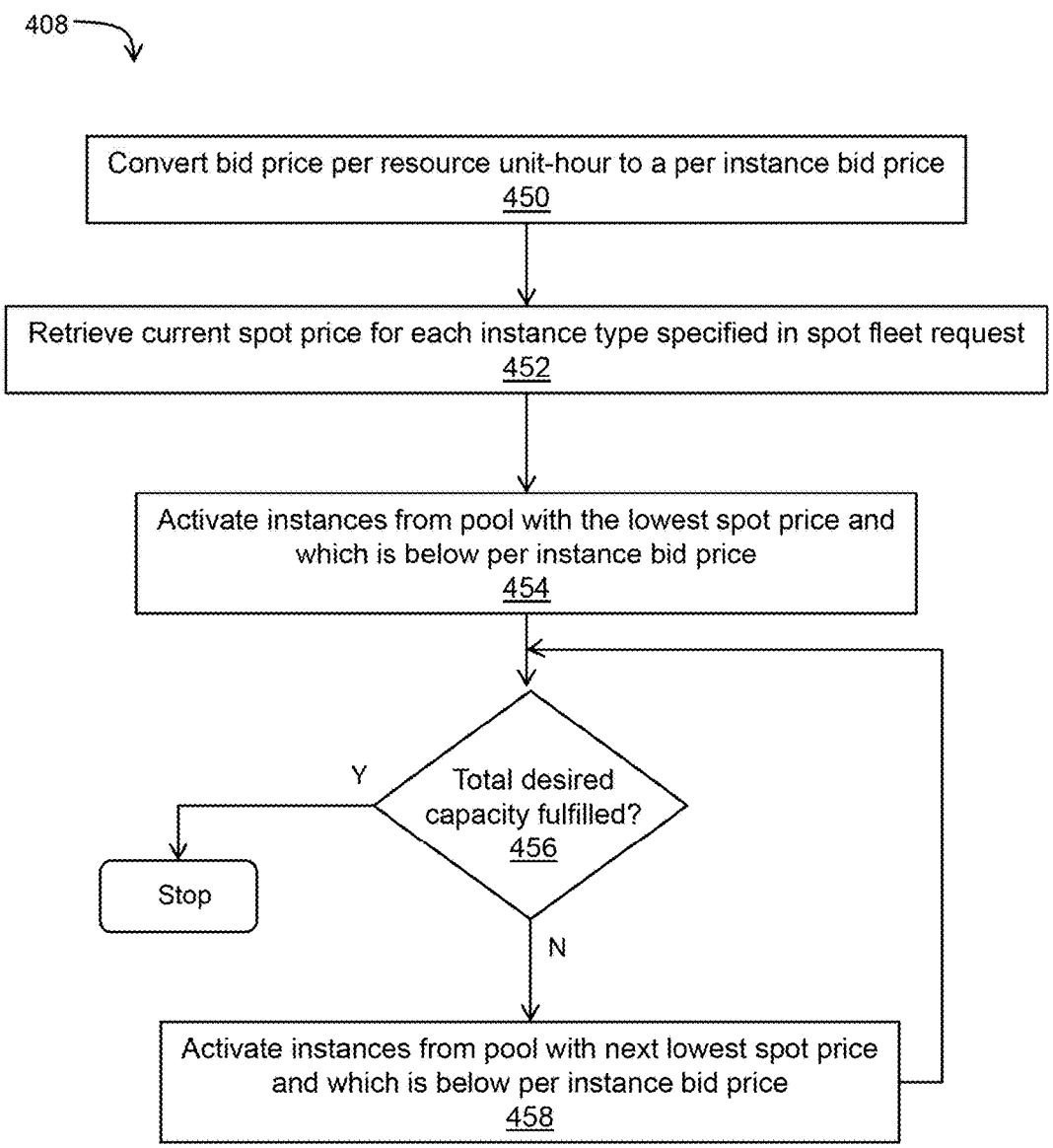
FIG. 10 shows a method for generating a spot fleet based on a per-resource unit bid price in accordance with various examples.

FIG. 10 shows an example of operation 408 for which the customer specified a bid price on a resource unit basis, rather than a per instance basis. The bid price may have been specified, for example, as an amount of money (e.g., $0.25) that the customer is willing to spend per hour for each designated type of resource unit (e.g., physical CPU, vCPU, etc.). The spot pricing in the provider network, however, may be specified on a per instance-hour basis. That is, each instance has a particular price per hour, not each resource unit within the instances. Thus, at 450 the bid price per resource unit-hour is converted to a per instance-hour bid price to able to normalize the bid price per resource unit-hour to the units of per instance-hour to thereby facilitate the comparison of the bid price to the spot prices using the same units. If, for example, the bid price is $0.10 for each physical CPU per hour, and a given instance has 2 physical CPUs, then the conversion of its per CPU-hour bid price to a per instance-hour bid results in a bid price of $0.20 for each hour of that particular instance. The number of resource units of each resource type may be stored in the resource management database 191 and retrieved by the resource manager 180 to make the conversion. The number of resource units of each resource unit of each resource type represents a weight value that is known apriori by the service provider and/or can be manually provided by the customer in a user interface.

Once the bid price is converted into the same units as the spot prices for the various instances of interest per the customer's spot fleet request, then at 452, the method includes retrieving the current spot price for each potential instance to be included in the fleet. Based on the comparison of the spot prices to the converted bid prices (now given on a per instance-hour basis), instances can be activated at 454 from the pool with the lowest spot price and which is below the newly converted per instance-hour bid price. As noted above, the order in which instances are activated into the fleet need not be in ascending order of price. Operations 456 and 458 are similar to operations 424 and 426 in FIG. 9. That is, instances are activated into the fleet until the total desired capacity is satisfied. The total desired capacity may be specified as a number of resource units (e.g., 1000 physical CPUs) and thus the resource manager continues to activate instances until 1000 total physical CPUs are present in the fleet, regardless of the number of instances. The resource manager 180 may need to activate instances from additional spot instance pools 141 in order to fully satisfy the spot fleet request as explained above.

In the example of FIG. 10, the bid price was specified on a per resource unit-hour basis and thus conversion from a per resource unit-hour basis to a per instance-hour basis was performed at 450. If the bid price had been specified on a per job-hour basis, then a conversion from a number of job-hours to a per instance-hour basis would have occurred at 450. For example, if a given instance can perform two jobs per hour on average and the customer's bid price is $0.20 per hour for each job, then the $0.20/job-hour bid price is converted to $0.40/instance-hour for that particular instance type. The rest of the method flow in FIG. 10 remains the same.

Rather than converting the bid price to a per instance-hour price in order to compare it directly to the spot price, the spot price itself can be converted to the same units as the bid price. For example, if the bid price is given in term of a price per job-hour, the spot price can be converted to a per job-hour price based on the number of jobs that that instance can perform per hour. Specifically, the per instance-hour spot price may be divided by the number of jobs that that instance can performed on average per hour. By way of example, a spot price for a given instance may be $0.15/hour and the job weighting factor for that instance is 2.5 (i.e., it has been determined that the instance can complete 2.5 jobs per hour on average). The per hour spot price for the instance can be converted by dividing $0.15 by 2.5 to obtain a per job-hour spot price of $0.06. The per job-hour spot price can then be compared to the per job-hour bid price during the spot fleet creation process. Only those instances can be activated into the fleet that have per job-hour spot prices less than the bid price are candidates for inclusion in the fleet. The number of instances with a per job weighting factor of 2.5 that can be included in the fleet depends on the customer's specified total number of jobs to be completed per hour (the total desired capacity). If the customer wants to be able to complete 100 jobs per hour, for a 2.5 weighting factor for a particular instance, 40 such instances are needed to complete 100 jobs each hour (100 jobs divided by 2.5 jobs per hour for each instance equals 40 instances needed).

Figure 11:
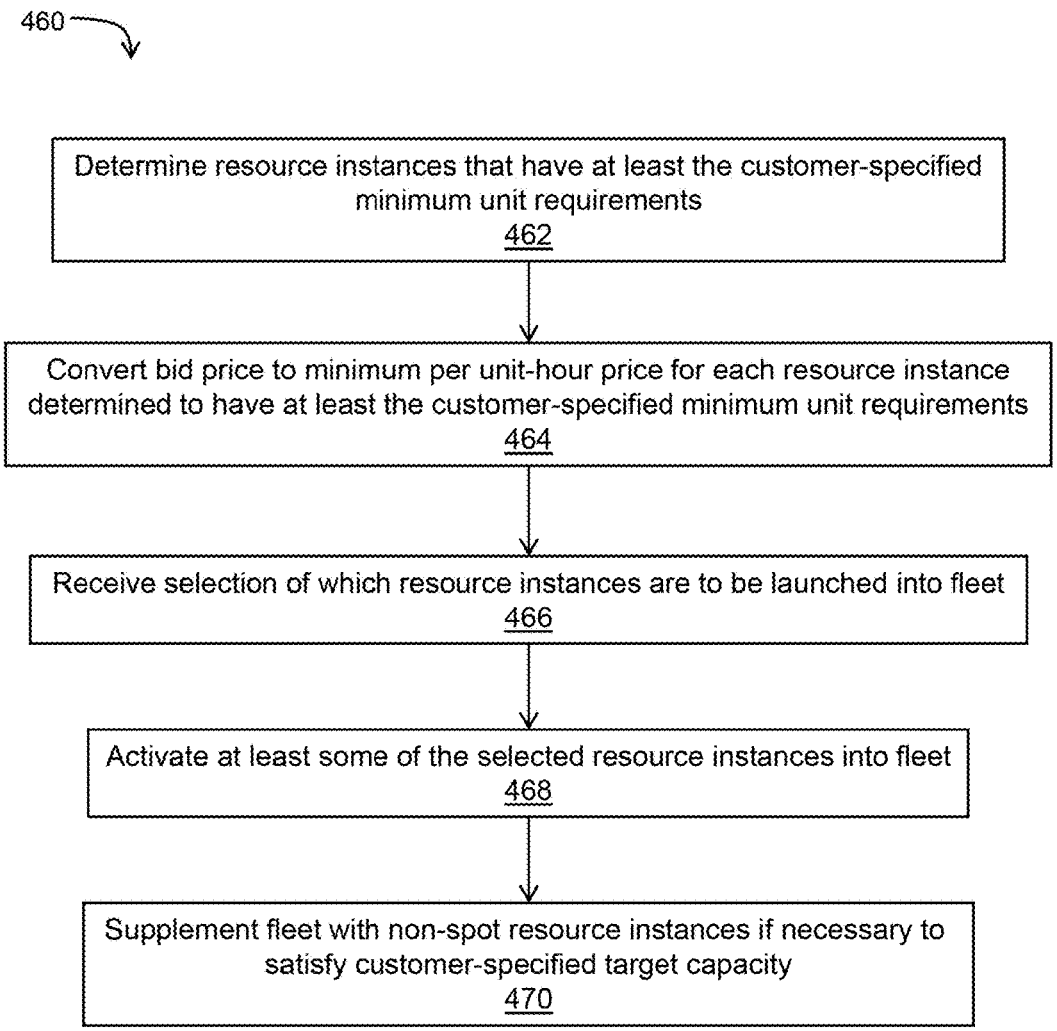
FIG. 11 shows a method for generating a spot fleet based on a per-minimum unit bid price in accordance with various examples.

FIG. 11 shows an example of operation 408 for which the customer provided a spot fleet request in which the capacity unit is "customizable" as in the user interface example of FIG. 6. As explained above with regard to FIG. 6, the customer can specify a minimum unit requirement including a plurality of resource units such as vCPUs, memory, and storage. At 462 in FIG. 11 the method includes determining the resource instances from the spot instance pools 141 that have at least the customer-specified minimum unit requirements. For example, if the customer specified 8 vCPUs, 32 GiB of memory and 1 GB of storage, then the resource manager 180 will determine which spot instance pools 141 have resource instances that have as a minimum these characteristics, that is at least 8 vCPUs, 32 GiB of memory and 1 GB of storage. The resource instances that have at least the minimum unit requirements are listed in the user interface as shown in the example of FIG. 6. At 464, the method includes converting the bid price specified by the customer to a minimum per unit-hour price for each resource instance determined to have at least the customer-specified minimum unit requirements. For example, if the customer bid price is for a minimum unit requirement including 8 vCPUs and a particular resource instances has 16 vCPUs, the resource manager 180 may double the bid price to generate the minimum per unit-hour price for that resource instance.

The customer then can select one or more of the resource instances determined to have at least the minimum per unit-hour price for each resource instance and the resource manager 180. At 466, the method thus includes receiving the customer's selection as to which resource instance types can be considered for launching into the fleet. At 468, the resource instance manager 18 then begins to activate resource instances from the selected set of resource instance types to form the customer's desired fleet of spot instances.

A customer may have specified a fleet formation strategy via a user interface. The customer-specified strategy might be that if there are an insufficient number of resource instances to fully satisfy the customer-supplied target capacity, the resource manager 180 may attempt to launch non-spot instances to supplement the fleet to thereby reach the customer-specified target capacity (470). In some embodiments, the customer may configure the request (e.g., via a configuration entry field) as to whether the non-spot instances can be launched on behalf of the customer to satisfy the target capacity and/or the number of such non-spot instances that can be launched to satisfy the target capacity. An example of non-spot instances includes on-demand instances from the on-demand instance pool 131. The configurable number of non-spot instances that be launched may be provided in the form of an absolute number (e.g., 20 instances) or a percentage of the total fleet size (e.g., no more than 10% of the fleet can be non-spot instances).

Other strategies are possible as well such as the lowest cost strategy in which the resource manager 180 attempts to launch instances while minimizing the total cost the customer. By way of another example, a customer could specify a strategy that X % of the fleet should be instances of a particular type, Y % should be instances of a different type and so on.

Figure 12:
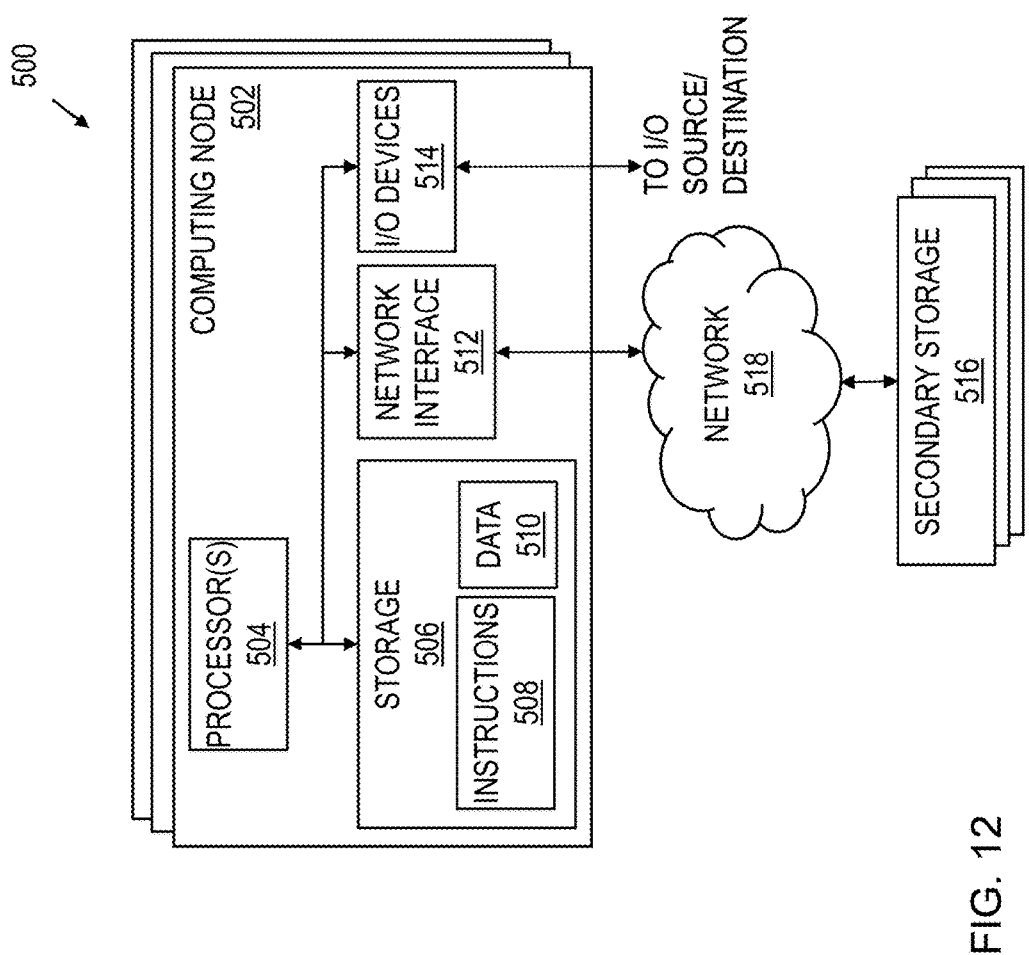
FIG. 12 is a block diagram illustrating an example computing device that may be used in some embodiments.

FIG. 12 shows a schematic diagram for a computing system 500 suitable for implementation of the web services platform 102, including the functionality to create and use cotenant policies and trust scores as described herein in accordance with various embodiments. The system includes one or more computing nodes 502. The computing system 500 includes the computing nodes 502 and secondary storage 516 communicatively coupled together via a network 518. One or more of the computing nodes 502 and associated secondary storage 516 may be used to provide the functionality of the resource manager 180, interface manager 183, customer interface 302, API processor 304, asynch workers 308, spot instance engine 310, and price service 312.

Each computing node 502 includes one or more processors 504 coupled to memory 506, network interface 512, and I/O devices 514. In some embodiments, a computing node 502 may implement the functionality of more than one component of the system 100. In various embodiments, a computing node 502 may be a uniprocessor system including one processor 504, or a multiprocessor system including several processors 504 (e.g., four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the web services platform 102, each of the computing nodes 502 may implement the same ISA, or individual computing nodes and/or replica groups of nodes may implement different ISAs.

The storage 506 may include a nom-transitory, computer-readable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage 506. For example, instructions 508 may include instructions that when executed by processor(s) 504 implement the resource manager 180, interface manager 183, customer interface 302, API processor 304, asynch workers 308, spot instance engine 310, price service 312, and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing nodes 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing node 502 for execution by a processor 504 by transmission media or signals via the network 518, which may be a wired or wireless network or a combination thereof. Each of the resource manager 180, interface manager 183, customer interface 302, API processor 304, asynch workers 308, spot instance engine 310, and price service 312 may be implemented as a separate computing node 502 executing software to provide the computing node with the functionality described herein. In some embodiments, two or more of the resource manager 180, interface manager 183, customer interface 302, API processor 304, asynch workers 308, spot instance engine 310, and price service 312 may be implemented by the same computing node.

The network interface 512 may be configured to allow data to be exchanged between computing nodes 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANS, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing nodes 502. Multiple input/output devices 514 may be present in a computing node 502 or may be distributed on various computing nodes 502 of the system 500. In some embodiments, similar input/output devices may be separate from computing node 502 and may interact with one or more computing nodes 502 of the system 500 through a veered or wireless connection, such as over network interface 512.

Those skilled in the art will appreciate that computing system 500 is merely illustrative and is not intended to limit the scope of embodiments. In particular, the computing system 500 may include any combination of hardware or software that can perform the functions disclosed herein, including computers, network devices, internet appliances, PDAs, wireless phones, pagers, etc. Computing node 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

What is claimed is:

1. A non-transitory storage device containing instructions that, when executed by a processing resource, cause a processing unit to:
   receive a request for a fleet of interruptible resource instances having a variable cost value, wherein the request specifies a bid cost value and a total desired capacity of the resource instances to be included in the fleet of interruptible resource instances;
   for each of multiple pools of interruptible resource instances, retrieve a current cost value for the interruptible resource instances of that pool;
   using a weight value assigned to the resource instances of each of the pools, convert the current cost value of each such pool to produce a normalized current cost value for that pool; and
   from a given pool of the multiple pools for which the request's bid cost value exceeds the normalized current cost value and for which the normalized current cost value is lower than all other normalized current cost values, activate interruptible resource instances from the given pool until there are no more interruptible resource instances from the given pool to be activated, and then to activate interruptible resource instances from another pool of the multiple pools for which the request's bid cost value exceeds the normalized current cost value.

2. The non-transitory storage device of claim 1 wherein the total desired capacity in the request includes a number of jobs to be completed in a defined period of time.

3. The non-transitory storage device of claim 1 wherein the total desired capacity in the request includes a number of resource units to be included in the fleet of resource units, wherein the resource units include at least one of a physical central processing unit (CPU), a virtual CPU, and an amount of memory.

4. A system, comprising:
   a plurality of computing devices configurable to implement a plurality of resource instances of a provider network; and
   one or more computing devices configured to implement a resource instance manager;
   wherein the resource instance manager is operable to:
      select a plurality of resource instances in response to a request for a plurality of resource instances that have variable cost values, wherein the request specifies a customer-specified cost value and a total desired capacity of the resource instances to be included in the plurality of interruptible resource instances, and wherein the resource instances selected are selected based on a comparison by the resource manager of the customer-specified cost value to a current cost value of the resource instances;
      activate the selected plurality of resource instances; and
      deactivate a currently activated resource instance based on the current cost value for the currently activated resource instance exceeding the customer-specified price, and wherein the resource manager then activates another resource instance based on a comparison of the customer-specified cost value to a current cost value of available resource instances.

5. The system of claim 4 wherein the customer-specified cost value includes a per-hour cost value for each instance to be included in the selected plurality of resource instances, the total desired capacity of the resource instances includes the number of resource instances to be included in the selected plurality of resource instances, and wherein the resource manager is operable to select the resource instances for which the current cost value is lower than the customer-specified cost value.

6. The system of claim 4 wherein the customer-specified cost value includes a per-time period cost value for each resource unit of the instances to be included in the selected plurality of resource instances, the total desired capacity of the resource instances includes the number of resource units to be implemented by the selected plurality of resource instances, and wherein the resource manager is operable to:
   using a weight value corresponding to the number of resource units included in each of a plurality of resource instances, convert the current cost value of such resource instances to a per resource unit current cost value; and
   select the resource instances for which the per resource unit current cost value is lower than the customer-specified per-time period cost value for each resource unit of the instances to be included in the selected plurality of resource instances.

7. The system of claim 6 wherein each resource unit includes at least one of a physical central processing unit and a virtual central processing unit.

8. The system of claim 4 wherein the customer-specified price includes a cost value for each job to be completed in a defined period of time, wherein the total desired capacity of the resource instances includes the number of jobs to be completed in a the defined period of time, and wherein the resource manager is operable to:
   using a weight value corresponding to the number of jobs that can be completed in a given unit of time for a plurality of resource instances, convert the current cost value of such resource instances to a per job-hour current cost value; and
   select the resource instances for which the job-hour current cost value is lower than the customer-specified cost value for each job to be completed in the defined period of time.

9. The system of claim 4 wherein the resource manager is operable to select the plurality of resource instances from among a plurality of pools of resource instances, each pool having a separate variable cost value.

10. The system of claim 9 wherein the resource manager is operable to select resource instances from each of a plurality of pools based on a comparison of the customer-specified cost value to the current cost value of resource instances in each respective pool until the total desired capacity is reached.

11. The system of claim 9 wherein the resource manager is operable to activate resource instances that have a variable cost value based on the comparison between the customer-specified cost value to a current cost value of the resource instances until such resource instances are exhausted that comply with the request, and to activate resource instances that do not have a variable cost value until the total desired capacity is reached.

12. A method, comprising:
- in response to a request for a fleet of interruptible resource instances to run on behalf of a customer, the request including a bid cost value and a value indicative of the number of resource instances to run on behalf of the customer,
- for each of multiple pools of interruptible resource instances, comparing that pool's current, but variable, cost value to the bid cost value from the request;
- activating interruptible resource instances from at least one of the multiple pools for which the pool's current, but variable, cost value is less than the bid cost value from the request, wherein activating the interruptible resource instances includes launching all available interruptible resource instances that comply with the customer's request; and
- activating non-interruptible resource instances until the value in the request indicative of the number of resource instances is reached.

13. The method of claim 12 wherein activating the interruptible resource instances from the at least one of the multiple pools includes activating interruptible resource instances from a first pool whose current, but variable cost value is the lowest among all of the other pools of interruptible resource instances before activating interruptible resource instances from any of the other pools.

14. The method of claim 12 wherein activating the interruptible resource instances from the at least one of the multiple pools includes activating interruptible resource instances from the pools based on a pool strategy configured by the customer.

15. The method of claim 12 wherein the bid cost value is a cost value per unit of time for a resource unit, and wherein the method further comprises normalizing the bid cost value to each of the multiple pools based on the number of resource units associated with the interruptible resource instances of each respective pool.

16. The method of claim 12 wherein the bid cost value is a cost value per unit of time for a resource unit, and wherein the method further comprises normalizing the current, but variable, cost value of each of the multiple pools to the bid cost value based on the number of resource units associated with the interruptible resource instances of each respective pool.

17. The method of claim 12 wherein the bid cost value is a cost value per unit of time for completion of a single job, and wherein the method further comprises normalizing the bid cost value to each of the multiple pools based on the number of jobs that can be completed in the unit of time by the interruptible resource instances of each respective pool.

18. The method of claim 12 further comprising:
- deactivating an interruptible resource instance currently activated on behalf of the customer based on the current, but variable, cost value of that instance exceeding the bid cost value; and
- activating a replacement interruptible resource on behalf of the customer from one of the multiple pools for which such pool's current, but variable, cost value is less than the bid cost value from the request.

19. The method of claim 12 wherein activating the interruptible resource instances from at least one of the multiple pools includes activating the interruptible resource instances from at least one of the multiple pools until the number of interruptible resource instances indicated by the value in the request is reached.

* * * * *